ated Aug. 2, 1921.

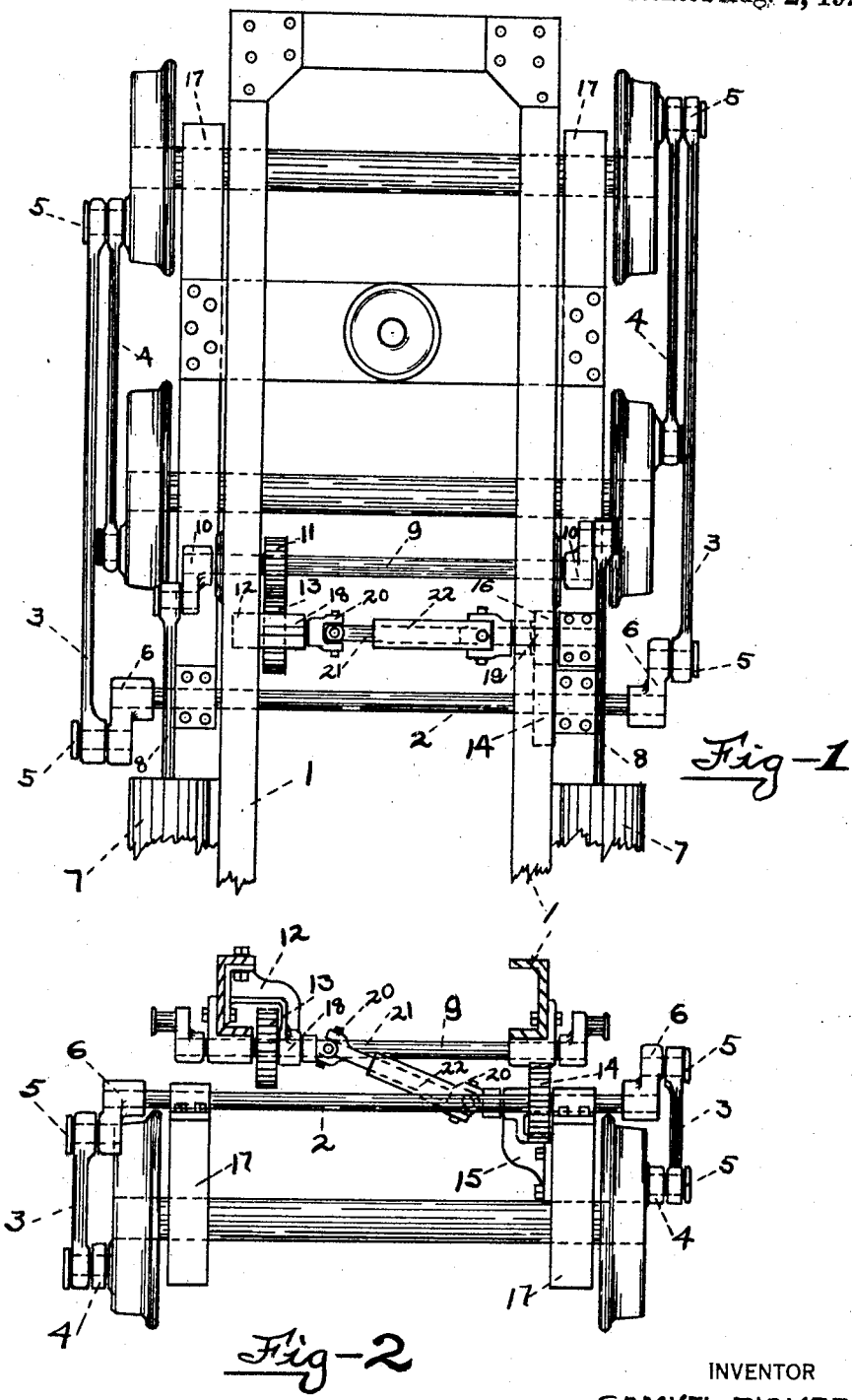

UNITED STATES PATENT OFFICE.

SAMUEL PICKERING OF BELLEVUE, WASHINGTON.

DRIVING MECHANISM FOR LOCOMOTIVES.

1,386,528. Specification of Letters Patent. Patented Aug. 2, 1921.

Application filed January 17, 1921. Serial No. 437,746.

*To all whom it may concern:*

Be it known that I, SAMUEL PICKERING, a citizen of the United States, residing at Bellevue, in the county of King and State of Washington, have invented a new and useful Driving Mechanism for Locomotives, of which the following is a specification.

My invention, relating as it does to locomotives, and particularly to driving mechanism therefor, is an improvement upon my invention in the same art, set forth in my application Serial Number 413,098, filed in the United States Patent Office September 27th, 1920.

The objects of my improvement are, to provide between the locomotive frame and a truck in which the driven wheels are journaled, a driving connection comprising a single telescopic member suitably mounted to take up variations in angular positions and in distances between the frame and the truck while the locomotive is in operation. This single telescopic member is designed to take the place of the two telescopic units set forth in my prior invention referred to. In furtherance of this improvement I also provide a new and different arrangement of shafts and gearing, associated with said telescopic member, whereby shocks from the cylinders are absorbed by these new parts, and the power communicated to the driving wheels is more uniform in character—an application of power especially useful on upgrades. The new construction also relieves the couplings of the telescopic member of considerable strain to which, under the old arrangement of parts, they were subjected.

The accompanying drawings illustrate an embodiment of my invention, wherein—

Figure 1 is a plan view of the main frame of a locomotive and forward truck, with the frame and cylinders broken away, showing my invention in place.

Fig. 2 is an elevation of said frame and truck, including the invention, looking forward of the cylinders, and the drawing being partly in plan and in section.

In the drawings, 1 designates a broken section of a locomotive frame supported by a truck, the wheels of which I prefer to be so journaled therein that there will be no relative motion between the wheels, or their axles, and the journals. At 2 I provide a shaft which is journaled in the truck side members and connected with the wheels through the instrumentality of the usual rods 3 and 4, their connections 5, and the crank arms 6. For the purpose of better illustrating the invention, I have located the cylinders as shown by the broken off sections 7. These, however, may be so located as to facilitate the linking up of the different units required and to distribute the power thereto. 8 designates the piston rods operatively connected on either side with the shaft 9 through the crank arms 10. This shaft extends transversely of the locomotive frame and is journaled therein. It carries at one side, and fixedly attached thereto, a spur gear wheel as designated by 11. Attached to the locomotive frame is a bracket 12 carrying on a stub shaft a gear wheel 13, which meshes with the gear wheel 11. Fixedly attached to the opposite side of the shaft 2 is a spur gear wheel designated as 14. 15, in Fig. 2, illustrates a bracket attached to a side member of the truck in which is carried on a stub shaft a spur gear wheel 16, indicated by dotted lines in Fig. 1. This gear meshes with the wheel 14. The side members of the truck are designated as 17. The stub shafts on which the gear wheels 13 and 16 are mounted are journaled in the brackets referred to and are designated as 18 and 19. Through the medium of universal couplings 20 at the ends of said shafts which extend from the brackets I connect the points 18 and 19, as indicated, with a telescopic member comprising, in its preferred form a square or polygonal shaped bar 21 working within the sleeve 22. This provides a single extensible and contractible driving connection between the points indicated adapted to take up variations both in angular positions and distances which occur in travel.

In operation, the power from the cylinders is directly communicated to the shaft 9, as indicated, the gear wheel 11 mounted on said shaft meshing with the gear 13 carries the power to the telescopic driving connection, which, through the gear wheels 16 and 14 communicates the power to the main driving shaft 2.

In my first invention, herein referred to, I provided as the preferred embodiment thereof, a pair of these extensible and contractible members. In the present device, I have simplified the mechanism by eliminating one of these members and so arranging the parts that one member will perform the functions heretofore required of two, and in a more efficient manner. By the compact mechanism herein set forth, strain is taken from the couplings of the telescopic member, the driving wheels are relieved of jar from the cylinders, and a more even and satisfactory application of motive power is attained.

I claim:

1. In a locomotive having driving wheels journaled in swinging trucks, driving means for said wheels comprising a shaft journaled in the main frame and extending transversely thereof, a spur gear wheel fixedly attached to said shaft and located interiorly of the frame, a bracket mounted on the main frame having a stub shaft journaled therein carrying a spur gear wheel adapted to mesh with said first gear wheel, a shaft journaled in the truck frame and extending transversely thereof, a spur gear wheel fixedly attached to said shaft and located interiorly of the truck frame, a bracket mounted on the truck frame and located oppositely and below the first bracket, having a stub shaft journaled therein carrying a spur gear wheel adapted to mesh with the gear wheel on said shaft journaled in the truck frame, a telescoping member extending between said opposite stub shafts, and universal joints interposed between and connecting each stub shaft with its respectively adjacent end of the telescoping member, means for transmitting power to said mechanism and for communicating the same to the driving wheels.

2. In a locomotive having driving wheels journaled in swinging trucks, driving means for said wheels comprising a shaft journaled in the main frame and extending transversely thereof, gearing mounted on said shaft and located interiorly of the frame, a bracket mounted on the main frame having a stub shaft journaled therein carrying gearing adapted to mesh with said first gearing, a shaft journaled in the truck frame and extending transversely thereof, gearing mounted on said shaft and located interiorly of the truck frame, a bracket mounted on the truck frame and located oppositely and below the first bracket, having a stub shaft journaled therein carrying gearing adapted to mesh with the gearing on said shaft journaled in the truck frame, a driving connection consisting of a single extensible and contractible member extending between said opposite stub shafts, means permitting variations of the angular position of the member between said shafts and for connecting the same thereto, means for transmitting power to said mechanism and for communicating the same to the driving wheels.

SAMUEL PICKERING.